2,986,581
Patented May 30, 1961

2,986,581
PRODUCTION OF AROMATIC DISULFIDES

Joseph Levy, Paramus, N.J., and Joseph H. Mayer, New York, N.Y., assignors to The Trubek Laboratories, East Rutherford, N.J., a corporation of New Jersey No Drawing. Filed Nov. 5, 1959, Ser. No. 851,003

12 Claims. (Cl. 260—608)

This invention relates to the production of aromatic disulfides and is directed particularly to the preparation of aromatic disulfides from the corresponding aromatic sulfonyl chlorides.

In reducing aromatic sulfonyl chlorides various compounds may be produced such as sulfinic acids, disulfoxides, disulfides and thiophenols depending upon the conditions under which the reaction is carried out. As a result, it is not unusual in such reduction reactions to produce a number of related products which are difficult to separate and necessitate complicated purification procedures. The resultant low yields of the desired products and the expense involved in purification thereof have made prior processes commercially unacceptable.

It has been suggested heretofore that bis(nitrophenyl) disulfide might be produced by adding an acid sulfite to a heated mixture of meta-nitrobenzene sulfonyl chloride and hydriodic acid. While this reaction proceeds quite well with but little formation of undesired reduction products, the reaction must be carefully controlled to prevent the liberation of sulfur dioxide from the reducing mixture. Moreover, there is a tendency for the sulfonyl chloride to be hydrolyzed when heated in the presence of water with the resulting formation of sulfonic acids as by-products and resultant loss in yield.

It has now been discovered that it is possible to obtain high yields of aromatic disulfides from the corresponding sulfonyl chlorides without encountering the objections and limitations of the prior art provided phosphorous acid is used in combination with hydriodic acid, iodine, or a metallic iodide in reducing the aromatic sulfonyl chloride. The formation of undesired sulfonic acid by-products is reduced by carrying out the process in such a way that the sulfonyl chloride is added gradually to the reducing agents at such a rate that hydrolysis of the sulfonyl chloride is minimized. It has been discovered further that relatively impure phosphorous acid mixtures can be employed as reducing agents with the result that it is possible to use waste products such as those obtained as by-products in the production of organic acid chlorides. It is, therefore, possible ot obtain high yields of relatively pure aromatic disulfides by reactions employing materials which have heretofore been considered waste products.

Accordingly, it is an object of the invention to provide simple and economical processes for the production of aromatic disulfides using hydriodic acid in the presence of phosphorous acid as reducing agents.

Another object of the invention is to provide processes for the production of aromatic disulfides wherein the formation of undesired side reaction products are reduced to a minimum.

A further object of the invention is to provide a reaction for producing aromatic disulfides from aromatic sulfonyl chlorides wherein hydrolysis of the sulfonyl chlorides is kept to a minimum.

A specific object of the invention is to provide methods for producing aromatic disulfides wherein waste products containing phosphorous acid are employed as reducing agents in carrying out the process.

These and other objects and features of the present invention will appear from the following description thereof wherein reference is made to typical procedures and operations designed to indicate the nature of the present invention without intending to limit the scope thereof.

The reaction which takes place when reducing aromatic sulfonyl chlorides to produce the corresponding disulfides may be represented by the equation $$2RSO_2Cl + 10HI \rightarrow R\text{—}S\text{—}S\text{—}R + 2HCl + 4H_2O + 5I_2$$

The function of the phosphorous acid in conducting the reaction is to regenerate the hydriodic acid by reduction of the iodine produced. It, therefore, does not enter into the reaction by which the aromatic disulfides are produced and can be employed in suitable amounts to assure continuation of the reaction.

The reaction is general in its application and may be employed in reducing a great variety of aromatic sulfonyl chlorides. The aromatic nucleus of the sulfonyl chloride may be substituted with lower alkyl, nitro, halogen or other groups which are not reduced or otherwise acted upon by the phosphorous acid-iodide solution. Typical of such aromatic sulfonyl chlorides are benzene sulfonyl chloride, meta-nitrobenzene sulfonyl chloride, toluene sulfonyl chloride, para-chlorbenzene sulfonyl chloride, and the like.

The source of iodine used may also be varied. Thus, hydriodic acid, iodine, and metal iodides may be used. Since the hydriodic acid is continuously regenerated during the reaction, only relatively small amounts thereof are required. Generally, about 0.1 mole of the iodine material per mol of sulfonyl chloride is used but as little as 0.01 or as much as 1 mole of the iodine reagent may be used.

The aqueous phosphorous acid employed is generally used in excess and from about 2.5 to 5 moles or more of the phosphorous acid may be employed per mol of the aromatic sulfonyl chloride used.

Various sources of phosphorous acid may be used such as commercial phosphorous acid, phosphorous trichloride, and the like. It is also possible to use crude waste products containing phosphorous acid and it has been found to be particularly economical to use the waste phosphorous acid obtained as a by-product in the production of organic acid chlorides by the use of phosphorous trichloride. When such waste materials result from the production of lower molecular weight acid chlorides such as acetyl, propionyl or butyryl chlorides, the impurities contained therein are completely water soluble and such crude phosphorous acid can be used as obtained. When the by-product phosphorous acid is obtained from the production of higher molecular weight chlorides such as lauroyl chloride, for example, small amounts of insoluble material usually separate on diluting with water, but such impurities can be readily filtered from the resulting aqueous phosphorous acid solution prior to its use in the present process.

The reaction proceeds rapidly at 85° C. but may be carried out at temperatures varying from 20° C. or up to refluxing temperatures of about 100° C.

In conducting the reaction it is preferable to add the aromatic sulfonyl chloride to the aqueous reducing mixture in small increments governed by the rate at which the hydriodic acid is regenerated from the iodine. This is readily determined by observation since the characteristic iodine color is dissipated as the hydriodic acid is produced. The addition of an excess of the aromatic sulfonyl chloride should be avoided since it tends to hydrolize at elevated temperatures in the presence of water with the formation of sulfonic acids, which are not then reduced to the desired disulfide.

The aromatic sulfonyl chloride is conveniently added to the aqueous phosphorous acid-hydriodic acid reaction mixture when dissolved in an inert solvent, although this is not necessary to accomplish the reduction. Hydrocarbon solvents are particularly effective, such as benzene, toluene, heptane and the like. Water miscible solvents such as acetic acid, propionic acid, dioxane and the like, can also be utilized.

In order to indicate typical procedures in accordance with the present invention, the following examples are cited:

*Example I*

An aqueous phosphorous acid solution was prepared by adding 90 gms. of crude phosphorous acid, obtained as the by-product in the production of acetyl chloride from acetic acid and phosphorous trichloride, to 60 gms. of water. A solution of 3.2 gms. of potassium iodide (0.02 mole) dissolved in 10 gms. water was added to the aqueous solution and the mixture heated to about 85° C. A solution of 44.4 gms. (0.2 mole) of m-nitrobenzene sulfonyl chloride (non-recrystallized material of M.P. 57–60.6° C.) in 50 gms. of acetic acid was then gradually added at about the same rate that the liberated iodine was converted to hydriodic acid by the action of the phosphorous acid. The addition required about three hours and after stirring for another one-half hour at about 95° C., the cream colored mixture was diluted with 500 gms. water and cooled. The solids were then filtered from the cooled solution, washed with water and dried. There were obtained 28.8 gms. (93.5% of theory) of bis (meta-nitrophenyl) disulfide with a melting point of 75.6° to 78.6° C. The infra-red spectrum of the product was substantially the same as that of an authentic sample of the disulfide.

*Example II*

The procedure of Example I was repeated except that the meta-nitrobenzenesulfonyl chloride was added dissolved in 60 gms. toluene instead of the acetic acid and the addition was made over a period of about nine hours. After diluting the reaction mixture with water, the toluene layer was separated and the aqueous layer extracted with 60 gms. of toluene. The combined toluene extracts were then washed with 150 gms. of a 10% salt solution and the toluene evaporated to give 30.8 gms. (100% of theory) of an oil which solidified on cooling and had an M.P. of 73.6–75.8° C. The infra-red spectrum of this product was substantially the same as that of an authentic sample of bis (meta-nitrophenyl) disulfide.

*Example III*

About 8 gms. (0.05 mole) of potassium iodide was dissolved in 25 gms. of water and the solution added to 450 gms. of aqueous crude phosphorous acid containing 2.3 moles phosphorous acid (by iodimetric analysis). The mixture was heated to about 85° C. and a solution of 111 gms. of meta-nitrobenzenesulfonyl chloride (non-purified material M.P. of 53.2–60.5° C.) in 150 gms. of toluene was added over a period of about 11 hours. After diluting with 750 gms. of water, the toluene layer was separated and the aqueous layer extracted with 150 gms. of toluene. The combined toluene extracts were then washed with a 10% salt solution and the toluene evaporated to give 72.5 gms. (94% of theory) of product which solidified on cooling. This material had a melting point of 72.6 to 78° C. and its infra-red spectrum was substantially the same as that of an authentic sample of bis (meta-nitrophenyl) disulfide.

*Example IV*

An aqueous phosphorous acid solution was prepared from by-product phosphorous acid obtained from the reaction of lauric acid with phosphorous trichloride. After addition of potassium iodide, the mixture was filtered to remove the relatively small amount of insoluble organic material which had separated. A 258 gms. portion of this solution containing 2.18 moles of phosphorous acid (by iodimetric analysis) and 8 gms. potassium iodide was then reacted with 111 gms. of meta-nitrobenzenesulfonyl chloride (M.P. of 53.2° to 60.5° C.) as in Example III except the addition was made in about 5 hours. There were obtained 67 gms. bis (meta-nitrophenyl) disulfide with a melting point of 72–77° C.

*Example V*

An aqueous solution of phosphorous acid was prepared from by-product phosphorous acid obtained from the reaction of propionic acid and phosphorous trichloride. A 760 gms. portion of this solution containing 4.6 moles phosphorous acid (by iodimetric analysis) were mixed with a solution of 16 gms. of potassium iodide in 50 gms. of water and the mixture heated to 85° C. A solution of 176.5 gms. benzenesulfonyl chloride in an equal weight of toluene was then gradually added during about five hours. The product was isolated as in Example II. There were obtained 34.7 gms. of diphenyl-disulfide having a melting point of 56.2–58.6° C.

*Example VI*

A mixture of 38.1 gms. of p-toluenesulfonyl chloride and 80 gms. of acetic acid were added at about 85° C. during about one and one-half hours to a mixture of 152 gms. of the phosphorous acid solution of Example V and 3.2 gms. of potassium iodide. The reaction mixture was then diluted with 250 gms. water, cooled to about 5° C., and the crystallized solids filtered, washed with water, and dried. There were obtained 7.0 gms. of ditolyl-disulfide having a melting point of 44.2–45.7° C.

*Example VII*

A mixture of 52.8 gms. of chlorbenzenesulfonyl chloride and 75 gms. of toluene was added at about 85° over a seven hour period to a mixture of 225 gms. of the phosphorous acid solution of Example V and 4 gms. of potassium iodide. The mixture was then diluted with water and the toluene layer separated. The aqueous layer was then extracted with 75 gms. of toluene and the combined toluene extracts washed with a 10% salt solution. On evaporating of the toluene, there were obtained 24.2 gms. of product, which upon recrystallization from methanol gave 21.4 gms. of bis (p-chlorphenyl) disulfide having a melting point of 70.7–71.9° C.

In some instances the phosphorous acid may be formed in situ during the reaction for this purpose phosphorous trichloride may be added to the aqueous reaction mixture as the reaction proceeds.

*Example VIII*

21.3 gms. meta-nitrobenzenesulfonyl chloride was added to a solution of 1.6 gms. potassium iodide in 100 gms. water and the mixture heated to about 65° C. Reaction took place with liberation of iodine. 35 gms. phosphorous trichloride were then gradually added during a period of about one hour keeping the temperature at about 65–75° C. This rate of addition was sufficient to discharge the iodine color as rapidly as it formed. The mixture was then heated to about 90° C. for about one half hour, diluted with 100 gms. water, and cooled to about 5° C. The crystallized solids were filtered, washed with water, and dried. There were obtained 5.5 gms. bis (meta-nitrophenyl) disulfide with M.P. of 80.4° to 81.3° C.

It will be apparent from the foregoing examples that the present invention is capable of numerous changes and modifications. It should, therefore, be understood that the particular methods and procedures cited are intended to be illustrative only and are not intended to limit the scope of the invention.

What is claimed is:

1. A process which comprises reacting an aromatic sulfonyl chloride having the formula R—$SO_2$—Cl wherein R is selected from the group consisting of substituted and unsubstituted benzene radicals with an aqueous mixture of phosphorous acid and a source of iodide ion to produce an aromatic disulfide having the formula R—SS—R.

2. The method of claim 1 wherein said source of iodide ion is an alkali metal iodide.

3. The method of claim 1 wherein the iodide is present in about 0.01 to about 1.0 mole per mole of aromatic sulfonyl chloride.

4. The method of claim 1 wherein said phosphorous acid is present in excess of the theoretical amount required.

5. The method of claim 1 wherein the reaction is carried out at a temperature of about 20° C. to about 100° C.

6. A process which comprises adding an aromatic sulfonyl chloride having the formula R—$SO_2$—Cl wherein R is selected from the group consisting of substituted and unsubstituted benzene radicals to a mixture of aqueous phosphorous acid and an alkali metal iodide at approximately the same rate as disappearance of iodine in the reaction mixture to produce the corresponding aromatic disulfide having the formula R—SS—R.

7. The process of claim 6 wherein said aromatic sulfonyl chloride is added to the mixture while dissolved in a solvent.

8. The process of claim 7 wherein said solvent is toluene.

9. A process which comprises reacting a benzene-sulfonyl chloride with a mixture of aqueous phosphorous acid and an alkali metal iodide to produce the corresponding diphenyl disulfide.

10. A process which comprises reacting m-nitrobenzene sulfonyl chloride with a mixture of aqueous phosphorous acid and an alkali metal iodide to produce bis-(m-nitrophenyl) disulfide.

11. A process which comprises reacting p-toulene-sulfonyl chloride with a mixture of aqueous phosphorous acid and an alkali metal iodide to produce ditolyl disulfide.

12. A process which comprises reacting p-chlorobenzenesulfonyl chloride with a mixture of aqueous phosphorous acid and an alkali metal iodide to produce bis-(p-chlorophenyl) disulfide.

References Cited in the file of this patent
UNITED STATES PATENTS 2,571,740   Marson _____ Oct. 16, 1951

OTHER REFERENCES

Kohlhase: J. Am. Chem. Soc. 54, 2441 (1932).
Bere et al.: J. Am. Chem. Soc. 125, 2359–2363 (1924).